United States Patent [19]
von Kaler et al.

[11] Patent Number: 5,182,966
[45] Date of Patent: Feb. 2, 1993

[54] CONTROL MECHANISM FOR A HYDROSTATIC TRANSAXLE

[75] Inventors: Roland L. von Kaler, Tecumseh; Dale I. Havens, Addison, both of Mich.

[73] Assignee: Tecumseh Products Company, Tecumseh, Mich.

[21] Appl. No.: 733,455

[22] Filed: Jul. 22, 1991

[51] Int. Cl.$^5$ .............................................. F16D 39/00
[52] U.S. Cl. ..................... 74/606 R; 91/497; 60/487
[58] Field of Search .............. 60/487, 494, 458, 465; 91/497, 474; 417/219; 475/78, 80, 83; 74/606 R

[56] References Cited

U.S. PATENT DOCUMENTS

| | | | |
|---|---|---|---|
| 2,309,148 | 1/1943 | Wilson et al. | 60/53 |
| 2,855,858 | 10/1958 | Larsen et al. | 417/219 X |
| 3,056,357 | 10/1962 | Bohnhoff | 91/475 X |
| 4,634,349 | 1/1987 | Abe et al. | 417/219 |
| 4,691,512 | 9/1987 | Thoma et al. | 60/456 |
| 4,784,013 | 11/1988 | Yamaoka et al. | 74/606 R |
| 4,843,818 | 7/1989 | Thoma et al. | 60/488 |
| 4,867,008 | 9/1989 | Yamaoka et al. | 74/606 R |
| 4,914,907 | 4/1990 | Okada | 60/487 |
| 4,920,859 | 5/1990 | Smart et al. | 91/497 |
| 4,942,780 | 7/1990 | Fujisaki et al. | 74/606 R X |
| 4,979,583 | 12/1990 | Thoma et al. | 180/62 |
| 5,042,252 | 8/1991 | Havens et al. | 60/487 |

Primary Examiner—Leslie A. Braun
Assistant Examiner—Khoi Q. Ta
Attorney, Agent, or Firm—Baker & Daniels

[57] ABSTRACT

A hydrostatic transaxle has a hydrostatic transmission, including a pump in fluid communication with a motor, the pump including a track ring for eccentrically varying radially displaceable pistons. A control mechanism for the pump is disposed adjacent to the axle assembly on the inboard side of the transmission. The pump track ring pivots about a pin disposed through one end of the pump track ring so as to be eccentrically adjustable about the pintle. The pin is located on the outboard side of the transmission or remote from the axle assembly, and is clampingly held between the portions of the transmission housing having casing bolts extending on either end therethrough.

16 Claims, 6 Drawing Sheets

CONTROL MECHANISM FOR A HYDROSTATIC TRANSAXLE

BACKGROUND OF THE INVENTION

1. Field of the Invention

The present invention generally relates to hydrostatic transaxles and, more particularly, is concerned with a control arrangement for the pump track ring.

2. Description of the Prior Art

Hydrostatic transmissions transmit rotary mechanical motion, typically from an internal combustion engine, to fluid motion, then back to rotary mechanical motion to rotate a drive axle in order to drive a vehicle such as a lawn and garden tractor or riding mower. The hydrostatic transmission regulates or controls the output rotary mechanical motion such that varying output speeds in the forward and reverse directions are possible with a single speed input rotary mechanical motion. Within a hydrostatic transmission of the radial piston type, a pump and motor each having a cylinder unit that rotates on a fixed pintle with pistons positioned within the cylinders and attached to slippers mounted in an expander band so that as the cylinder unit rotates, the slippers engage the surrounding eccentric annular track ring of the pump and motor. The pistons of the pump create a pressurized fluid flow that drives the motor pistons which rotate an output shaft. The transmission ratio is therefore directly proportional to the eccentricity of the track ring of the pump relative to the fixed pintle.

The eccentricity of the pump track ring must therefore be variable and this is accomplished by pivoting the track ring around an axis located at one end of the track ring, the axis generally being a pivot pin. In addition, a control mechanism adapted to swing or pivot the track ring around the pivot axis must also be provided so that an operator can change the eccentricity of the track ring.

Generally the track ring pivots around a pin or rod extending at least through the track ring on the inboard side, or proximal side relative to the gearing, of the transaxle casing and is held by the clamping force exerted by the two transmission casing halves that are bolted together. It is necessary, however, for the pivot pin to be mounted as securely as possible since the pivot pin bears a large amount of load. This is because of the pressure exerted on the pump track ring by the hydrostatic pressure within the pump and the torsional forces created by the pivotal movement of the track ring. This type of hydrostatic transmission is shown in U.S. Pat. No. 4,979,583, entitled VARIABLE SPEED TRANSAXLE, issued Dec. 25, 1990, and pending application Ser. No. 07/535,462, entitled VARIABLE SPEED TRANSAXLE, filed Jun. 8, 1990, both of which are specifically incorporated herein by reference.

The control rod mechanism for the pump track ring has heretofore been located on the outboard side, or distal side relative to the gearing, of the transaxle casing. This is disadvantageous in that the transmission casing must be extended in the forward direction as it is necessary to accommodate the control rod mechanism, which can cause interference with or the restriction of the area in which the mower blade deck is located on a conventional riding mower, in which the transmission is installed. It is thus desirable to maintain the front dimension of the transmission casing as small as possible so as to allow sufficient room for the mower deck to be raised.

SUMMARY OF THE INVENTION

In accordance with one aspect of the present invention, a control mechanism for the pump output adjustment mechanism, such as the pump track ring of a hydrostatic transmission, is located on the inboard or proximal side of the hydrostatic transaxle. In a radial piston type unit, the control unit varies the eccentricity of the pump track ring relative to the fixed pintle.

The pump track ring control mechanism, according to the present invention, solves the aforementioned problems by locating the control mechanism on the inboard side of the unit, thus decreasing the size of the transmission casing on the outboard side. A rotatable control rod extending into the transmission casing has a radially extending control rod pin located adjacent the pump track ring and adapted to pivot around the control rod in the same direction of rotation as the control rod thus causing the pump track ring to likewise pivot around its pivot pin.

In accordance with a further aspect of the present invention, the pivot pin for the pump track ring is located on the outboard or distal side of the hydrostatic transaxle allowing pivotally eccentric movement of the track ring about the pintle.

On the outboard side of the transmission casing the pump track ring is pivotally mounted on the pivot pin which is disposed between the two halves of the transmission casing, the mounting bolts for the halves are directly above the pivot pin and extend through bores located at each end of the pivot pin. The full clamping force on the housing occurs directly over the pin, which maintains it immobile, thereby providing a good bearing point for the track ring and eliminating noise and vibration.

A similar arrangement could be provided in a swash plate type hydrostatic transmission.

An advantage of the present invention is the compact design achievable over prior art systems.

Another advantage of the present invention is the high torque loads the pump track ring can withstand and the stability of the pivot pin within the transmission casing.

The invention, in one form thereof, provides in a hydrostatic transaxle a housing having a hydrostatic transmission and gear means driving an axle, the transmission having a pump and motor each including displaceable, rotatable pistons, the pump and motor being in fluid communication with each other through a conduit, and control means disposed proximal to said axle for varying the displacement of the pistons. The control means includes a surface engaged by the rotating pistons and means for rotating the surface to adjust the displacement of the pistons.

The invention in another form thereof provides in a hydrostatic transaxle a housing having a first part and a second part including a plurality of bolts for clampingly holding together the first part and the second part, and a hydrostatic transmission disposed within the housing. The transmission includes a pump fluidly connected to a motor, the pump having a plurality of displaceable, radially extending pistons, gearing operably connected to the motor, an axle assembly including differential means for operably connecting the gearing to the axle assembly, a pivot pin clamped between the housing parts, a track ring pivotally disposed on the pivot pin and radially surrounding the pistons for varying the displacement of the pistons as the track ring pivots, the pivot pin defining a pivot axis for the track ring, wherein the pin has at least one opening through which at least one of the plurality of bolts extends, the clamping force exerted by the bolt to clampingly hold together the housing secures the pivot pin.

It is therefore an object of the present invention to provide a more compact and smaller transmission casing.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
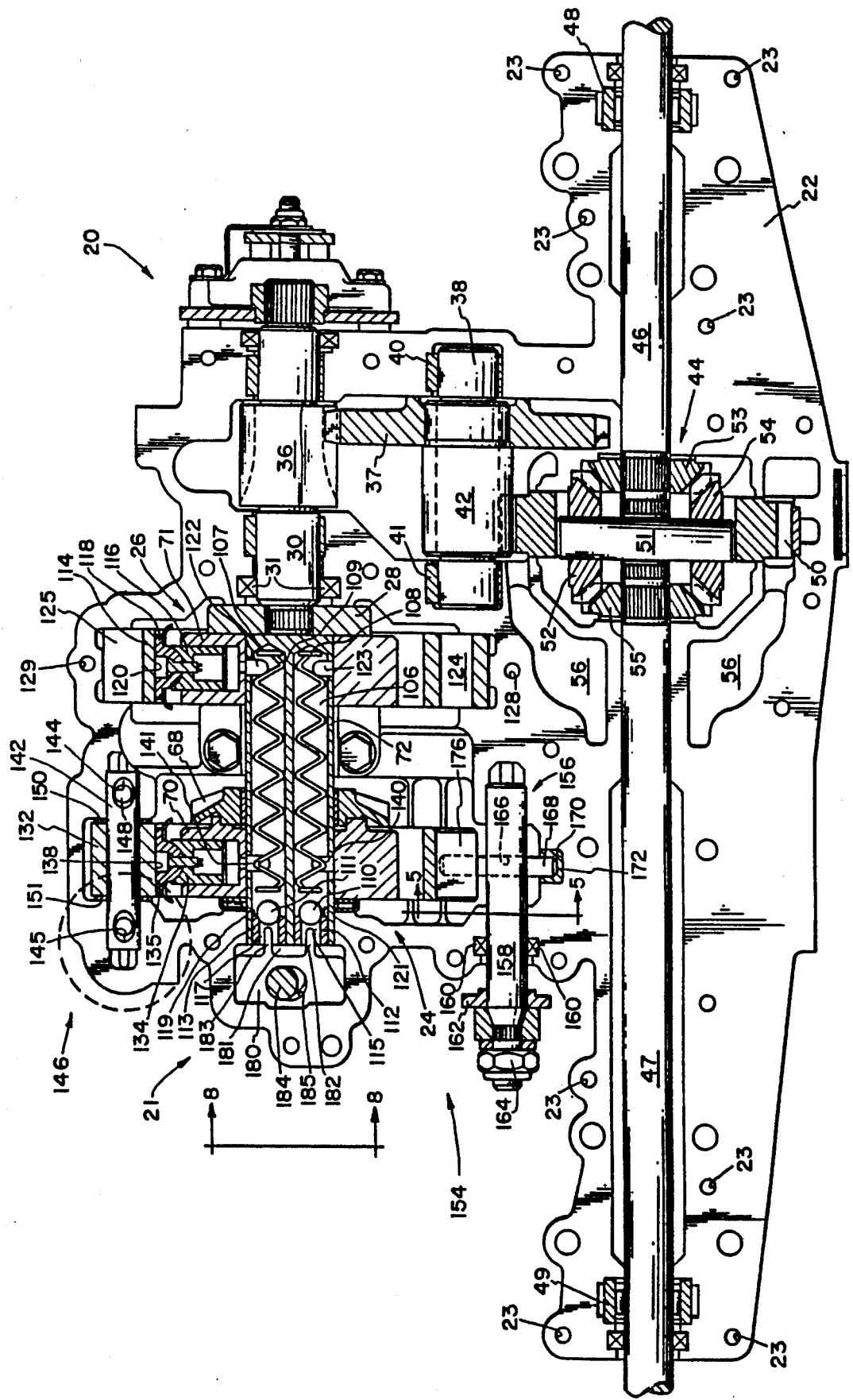
FIG. 1 is a horizontal sectional view showing a variable transaxle in accordance with the a preferred embodiment of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Figure 16:
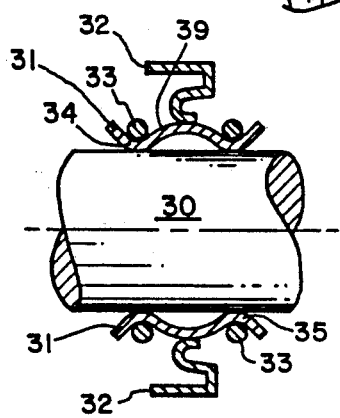
FIG. 16 is an enlarged fragmentary view of the oil seal.
Figure 14:
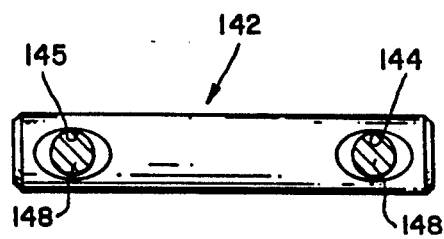
FIG. 14 is an elevational view of the pump track ring pivot pin.

Referring now to the drawings, and particularly to FIG. 1, there is shown a variable speed hydrostatic transaxle (HST) 20 in accordance with the principles of the present invention. HST 20 includes a hydraulic or hydrostatic unit 21 housed in a lower transaxle casing 22 having bolt holes 23, the hydrostatic unit 21 including a pump 24 and motor 26, being described in detail hereinbelow, for transferring rotary motion from an energy source such as an internal combustion engine (not shown) to the drive wheels of a vehicle (not shown) in which the HST 20 is installed. The drive wheels (not shown) are drivingly connected to the hydrostatic unit 21 through a succession of gearing beginning with an output member 28 axially connected to motor 26 so as to rotate therewith. Output member 28 is drivingly connected to an output shaft 30 seated in the transaxle casing of which only lower transaxle casing 22 is shown in FIG. 1, while pinion gear 36 is disposed on output shaft 30 which meshes with an output gear 37 disposed on a transfer shaft 38 supported by bearings 40 and 41. Disposed on transfer shaft 38 is a transfer gear 42 imparting its rotational energy to differential 44 for driving right and left axle shafts 46 and 47 each respectively supported in lower transaxle casing 22 by right and left axle bearings 48 and 49. Differential 44 includes a ring gear 50 meshed with transfer gear 42, a transverse shaft 51 and bevel gears 52, 53, 54, and 55, which are drivingly connected to right axle shaft 46 and left axle shaft 47. Surrounding differential 44 and the gearing is an oil chamber 56, which is separated from the chamber for the hydrostatic unit 21, and serves as a reservoir of oil to lubricate the differential 44. Thus as the motor 26 rotates, the motion is transferred to the axle shafts 46 and 47 to turn the wheels (not shown) attached thereto in order to drive the vehicle. Since the oil chamber 56 is separate from the hydrostatic unit 21, it is necessary to ensure that the oil from oil chamber 56 does not mix with the oil in the hydrostatic unit 21 to avoid contamination of this hydrostatic oil. Thus, there is radially provided on output shaft 30 a double-lipped oil seal 31 located adjacent output member 28. Referring to FIG. 16, the double-lipped oil seal 31 is essentially W-shaped having two lips 34 and 35 which are urged into contact with the surface of output shaft 30 by annular spring clip 32 and annular retainers 33. The retainers 33 hold lips 34 and 35 against shaft 30 while spring clip 32 urges the bowed center portion 39 inwardly. The double-lipped construction of oil seal 31 thus prevents the flow of oil from the differential side of the transaxle to the hydrostatic unit side, and vice versa.

Figure 2:
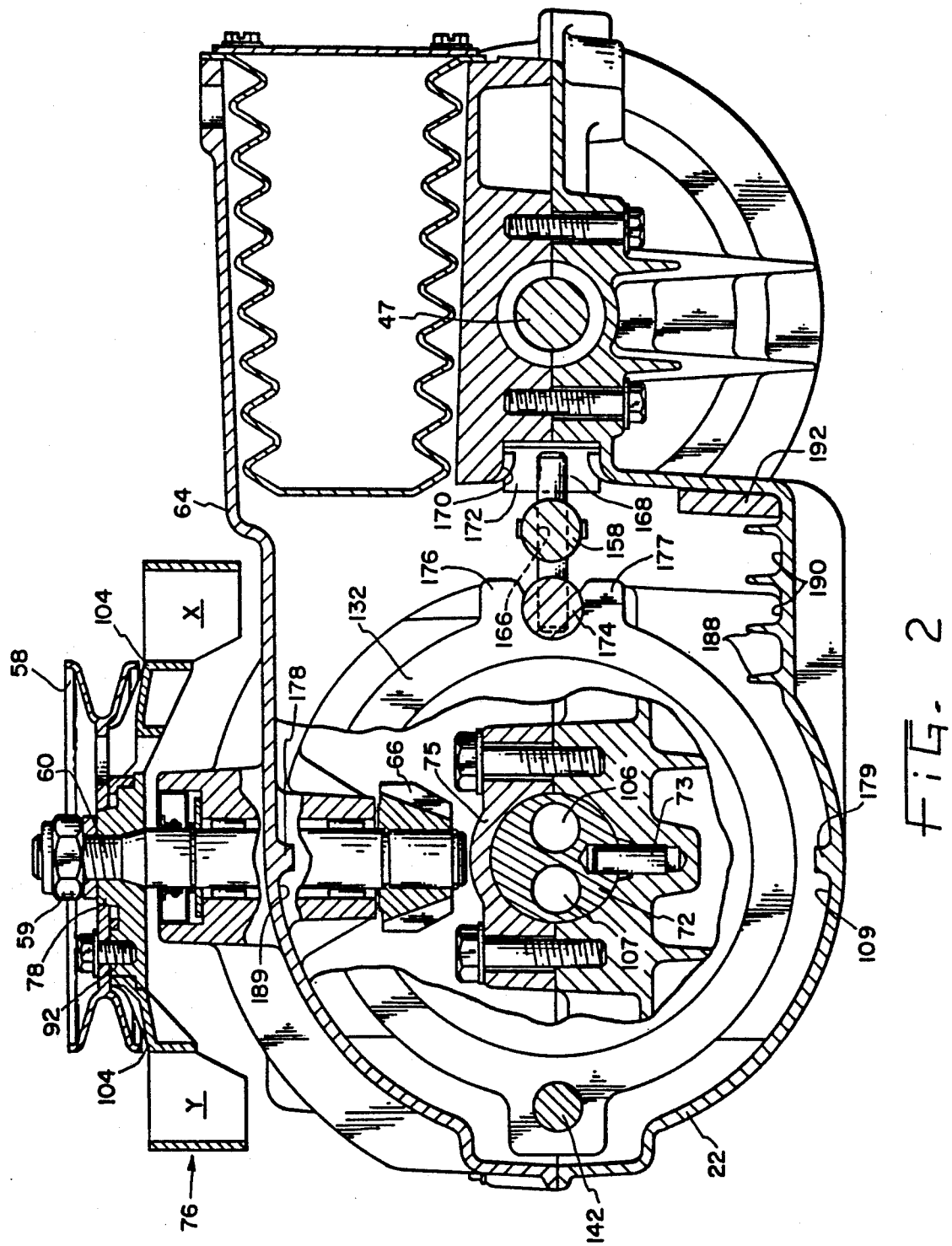
FIG. 2 is a partially cut away end view of the variable speed transaxle.
Figure 9:
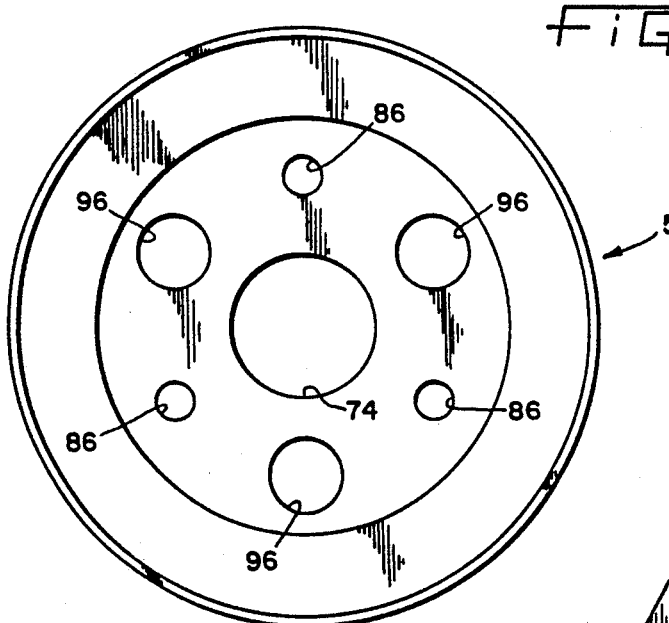
FIG. 9 is a plan view of the pulley.
Figure 10:
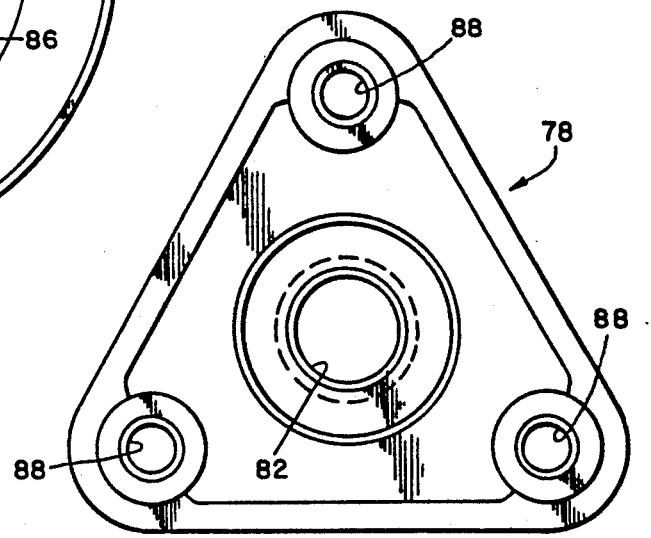
FIG. 10 is a plan view of the input drive coupling.
Figure 13:
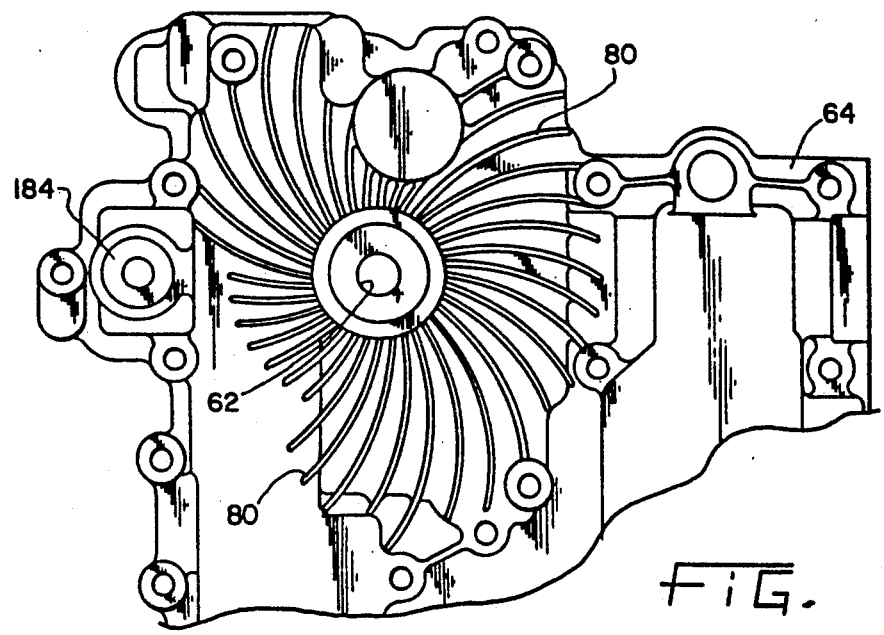
FIG. 13 is a fragmentary plan view of the upper transaxle housing over the input drive portion depicting the cast-in cooling vanes.

The hydrostatic unit 21, as mentioned above, is driven by an external energy source such as an internal combustion engine (not shown) and, referring to FIG. 2, is generally connected to the hydrostatic transmission 20 via a belt (not shown) from an output shaft of the internal combustion engine to a pulley 58. The pulley 58, depicted in FIG. 9, has an input drive shaft bore 74 that allows input drive shaft 60 to extend therethrough and is drivingly connected thereto by a nut 59 threaded onto the input drive shaft 60 which also extends through a bore 62 in the upper transaxle casing 64 (see FIG. 13) and terminates with a bevel gear 66 that meshes with a pump input bevel gear 68 mounted to a cylinder 70 being rotatably mounted on pintle 72 being fixed within the hydrostatic unit 21 by pin 73 and saddle clamp 75 (see FIG. 2). Thus, the rotation of input drive shaft 60 is imparted to the pump 24 to cause rotation thereof in order to drive motor 26 and the axles 46 and 47 as described above.

Referring to FIGS. 2 and 9-13, pulley 58 (FIG. 9) forms part of an external transaxle cooling system which, in cooperation with a fan 76 (FIGS. 11 and 12), a drive coupling 78 (FIG. 10), and external helical fins 80 (see FIG. 13) on the upper transaxle casing 64, all of which are described in detail hereinbelow, provides a continuous, helical air flow pattern that smoothly and unimpededly flows over the hydrostatic transmission 20 effecting cooling thereof with minimal air turbulence, since the fins 80 being curved in the same direction as the air flow pattern produced by the fan 76 act in mutual cooperation.

As best seen in FIG. 2, axially downwardly of pulley 58 is the drive coupling 78 likewise disposed or splined on input drive shaft 60 extending through an input drive shaft bore 82 of the drive coupling 78, and axially downwardly of drive coupling 78 is the fan 76 also disposed on input drive shaft 60 extending through an input drive shaft bore 84 of the fan 76. Thus, the drive coupling 78 is connected with input drive shaft 60 so as to rotatable therewith. Pulley 58, FIG. 9, drive coupling 78, FIG. 10, and fan 76, FIGS. 11 and 12, each respectively include bolt apertures 86, 88, and 90 in which are received coupling bolts 92 (of which only one is shown in FIG. 2) that hold pulley 58, drive coupling 78 and fan 76 together while disposed on the input drive shaft 60. Bolt apertures 88 are located at the apexes of the equilateral triangular shaped drive coupling 78 while bolt apertures 86, and 90 each form the apexes of an equilateral triangle that correspond with the shape of drive coupling 78. The drive coupling 78 is triangular shaped to correspond with a triangular shaped hub portion 94 in the center of fan 76 forming a semi-locking driving fit between the drive coupling 78 and fan 76. In addition, the triangular shape of drive coupling 78 allows for the communication of air apertures 96 and 98 respectively located in pulley 58 and fan 76 on the sides of the triangle formed by respective bolt apertures 86 and 90. Thus, when the pulley 58, drive coupling 78, and fan 76 are bolted together the air apertures 96 of the pulley 58 and air apertures 98 of the fan 76 are axially aligned (FIG. 2).

Figure 11:
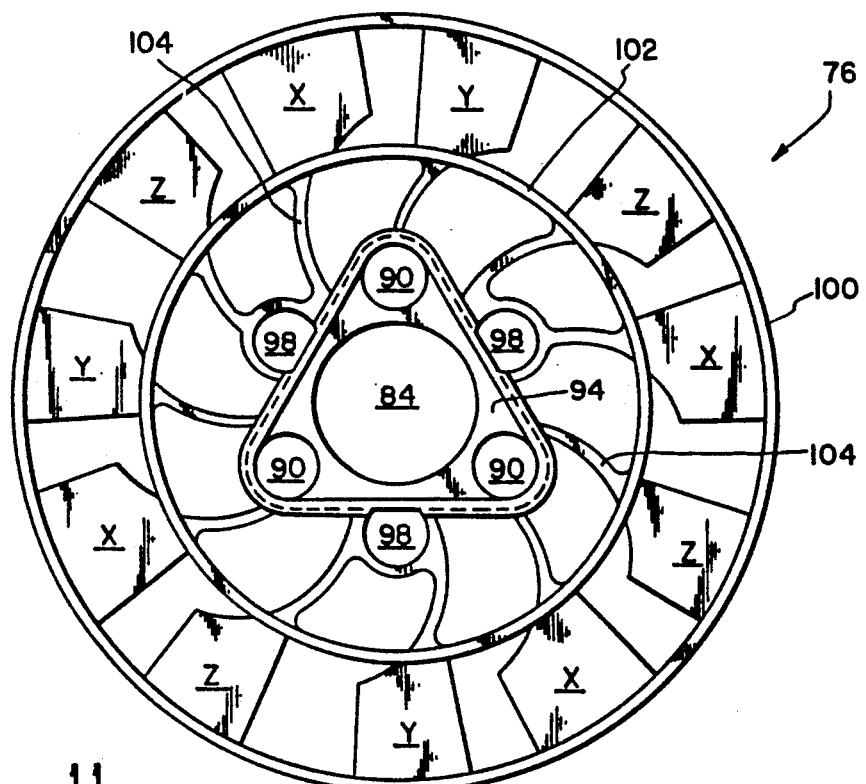
FIG. 11 is a bottom view of the fan.
Figure 12:
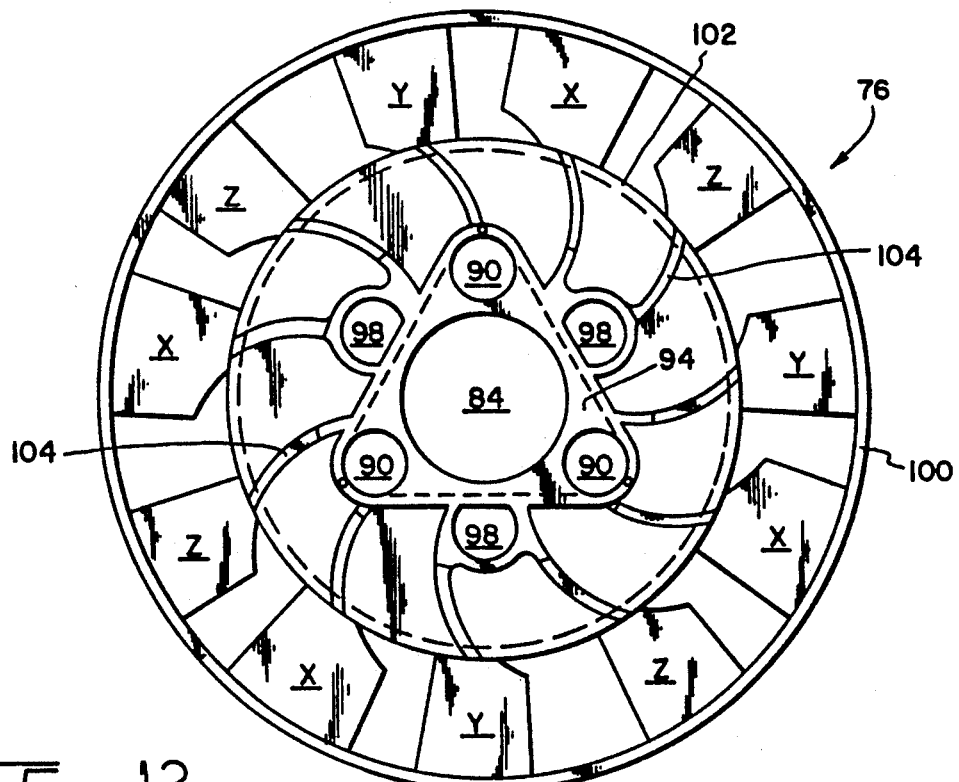
FIG. 12 is a top view of the fan.

The fan 76, referring to FIGS. 11 and 12, has three different shapes of outer fan blades X, Y, and Z, which axially extend from the top to the bottom of the fan 76 such that rotation of the fan 76 on input drive shaft 60 causes air to be drawn downwardly towards the hydrostatic transaxle 20, then outwardly. Blades X, Y, and Z also radially extend from the outer periphery 100 to an inner radius 102 for an extension distance that is approximately ⅓ of the total radius of the fan 76. Extending from the inner radius 102 to the triangular shaped hub portion 94 are fan ribs 104 that also axially extend from the top to the bottom of the fan 76 and act to direct the inflowing air downwardly toward external fins 80.

In operation, three elements, namely the air apertures 96 and 98, the blades X, Y, and Z, and the fan ribs 104 cooperatively serve to draw air into the fan 76 and create a helical air flow pattern which spreads downwardly and outwardly over the external fins 80 formed in the transaxle upper casing 64, while the radial shape of the external fins 80 correspond to the rotational direction of the helical air flow pattern to permit smooth and efficient cooling of the hydrostatic transaxle 20 by allowing the air to flow without impediment or created air turbulence that would retard or hinder the constant flow pattern created by the fan 76.

Now, referring again to FIG. 1, the hydraulic unit 21 of the hydrostatic transaxle 20, includes a pump 24, driven by the input system described above, which in turn drives the motor 26, both the pump and motor 26 being mounted on a fixed conduit in the form of pintle 72. The pintle 72 comprises two passageways or conduits 106 and 107 each having a spring 108 and 109 disposed therein which retain ball valves 110 and 111 adjacent seats 119 and 121 of plugs 112 and 113 threaded into one end of the pintle, each defining discharge ports 115 and 117. Thus, ball valves 110 and 111 normally close discharge ports 115 and 117 during operating condition due to the pressure exerted within pintle 72, except when make-up oil is needed, and this maintains a closed pressure system between the pump 24, the motor 26, and pintle 72. Radially outwardly surrounding pintle 72 is pump 24 (in FIG. 1 being on the left side) and motor 26 (in FIG. 1 being on the right side). The specific principles of operation of a hydrostatic unit 21 of the type as described hereinabove and below, will not be explained as the principles are known in the art and do not form a part of this invention. In general, however, a cylinder such as pump cylinder 70, being applicable to both the pump 24 and motor 26 of the hydrostatic unit 21, is rotatable on pintle 72 and has a plurality of bores (not shown) in which are disposed a plurality of pistons (e.g. pump piston 134 and motor piston 116) that axially reciprocate within the bores and radially rotate with respect to the pintle 72. The cylinders thus rotate around pintle 72 and within their respective track ring, described hereinbelow, while the respective pistons pump fluid through rotating action of the cylinder as in the case of pump 24, or are pumped by fluid pressure flowing through pintle passageways 106 and 107 of pintle 72 as in the case of motor 26. The pump 24 and motor 26 form a closed fluid path being in communication with each other via the pintle 72 and its pintle passageways 106 and 107, the fluid flowing from the action of the rotating pistons 134 of the pump 24 into the pistons 116 of the motor 26 causing the motor to rotate output member 28 being attached to the motor cylinder 71.

Motor 26 comprises a motor track ring 114 radially surrounding a plurality of pistons 116 having corresponding slippers 118, of which only one of each is shown, the slippers 118 radially adjacent to the inner radius 120 of motor track ring 114. The pistons 116 with their slippers 118 are rotatable around pintle 72 within the motor track ring 114 and are in fluid communication with the pintle tubes 106 and 107 via motor pintle ports 122 and 123. The motor track ring 114, however, is fixed eccentrically relative to the pintle 72 so that the pistons 116 reciprocate radially and rotate.

Figure 3:
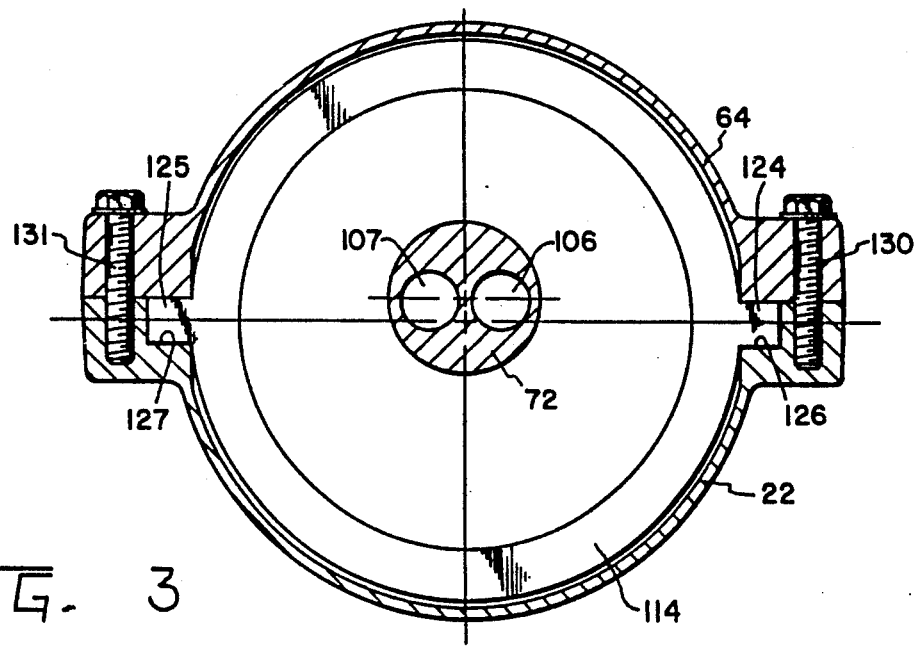
FIG. 3 is a sectional view of the track ring capturing arrangement in accordance with a preferred embodiment of the present invention.

Referring to FIG. 3, the motor track ring 114 includes radially extending lug portions 124 and 125 which fit into recesses 126 and 127 cast into the lower transaxle Casing 22. The upper transaxle casing 62 being attached to the lower transaxle casing 22, includes, radially adjacent the lug portions 124 and 125, bolt apertures 128 and 129 through which bolts 128 and 129 extend to thereby clampingly fix the motor track ring 114 between the upper and lower transaxle housings 64 and 22. The elimination of a pin or rod extending through the transaxle 20 to retain or fix the motor track ring 114 shortens the overall axial length of the transaxle and permits drive train gearing to be closer to the motor 26.

Alternatively, recesses could be formed in both housing halves 22 and 64, or in only the upper half 64. Other techniques could be used to clamp track ring 114 other than lugs 124 and 125.

As stated above, pump 24 radially surrounds pintle 72 and comprises a pump output adjustment means in the form of track ring 132 surrounding a plurality of pistons 134 having corresponding slippers 135, of which only one of each is shown, the slippers 135 radially adjacent to the inner radius 138 of pump track ring 132. The pistons 134 with their slippers 136 are rotatable around pintle 72 within the guide surface of the pump track ring 132 and are in fluid communication with the pintle tubes 106 and 107 via pump pintle ports 140 and 141. Pump track ring 132, however, is not fixed relative to pintle 72 as is motor track ring 114 although pump 24 is eccentric relative to pintle 72 as is motor 26. In order to create a variable output in both the forward and reverse directions from motor 26 and thus the axles 46 and 47, the pump track ring 132 eccentrically pivots around the pintle 72 which causes more or less fluid to be pumped from pistons 134 into pintle ports 140 and 142 through pintle tubes 106 and 107 out through motor pintle ports 122 and 123 driving motor pistons 116 depending on the degree and relative direction of eccentricity of the pump track ring 132 to the pintle 72.

Figure 4:
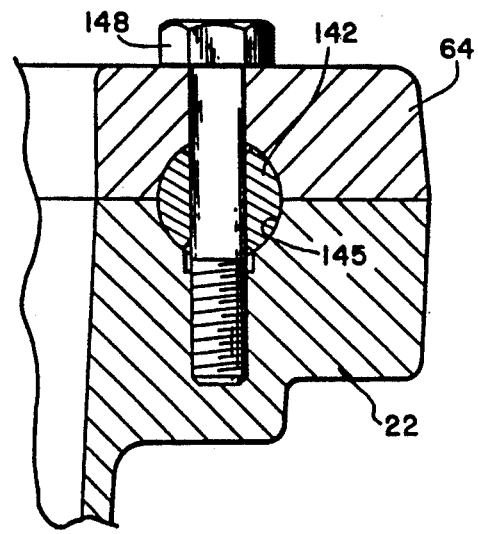
FIG. 4 is an enlarged fragmentary view of the pivot pin bolt taken along line 4—4 of FIG. 15.
Figure 7:
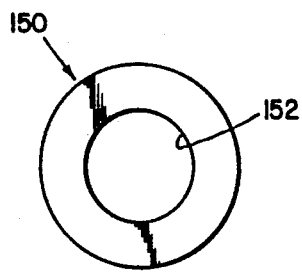
FIG. 7 is a plan view of the ring guide.
Figure 15:
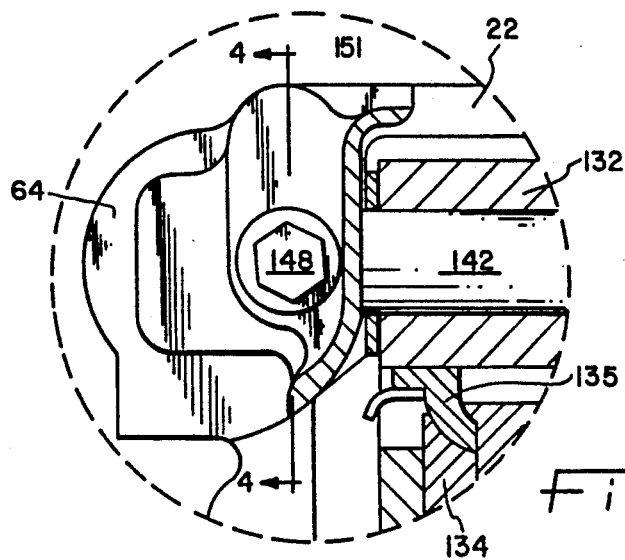
FIG. 15 is an enlarged fragmentary view of the dashed circular portion of FIG. 1 showing the connection of the pivot pin.

Referring to FIGS. 1, 4, and 14-15, the hydrostatic transaxle in accordance with the present invention comprises a pivot pin 142 having radial clearance bores 144 and 145 on both ends thereof is located on the outboard side 146 of the hydrostatic transaxle 20 relative to axle 46 and 47 and extends through the pump track ring 132 so that the pump track ring 132 may pivot about pivot pin 142. Since pivot pin 142 is subjected to a large amount of stress due to large hydrostatic pressures within pump 24, pivot pin 142 must be rigidly held in place. Two hydrostatic casing bolts 148 extend through the casing and through bores 144 and 145. Thus, as shown in FIGS. 15 and 4, pivot pin 142 is secured between the upper and lower casing halves 64 and 22 not only by the normal clamping force existing between the casing halves but also by the casing bolts extending through the pivot pin 142 itself exerting high localized clamping force. In order to promote smooth pivoting of the pump track ring 132, pivot pin guides 150 and 151 having pivot pin guide bores 152 (see FIG. 7) are disposed on pivot pin 142 on both sides of pump track ring 132 adjacent pump track ring 132 and the upper and lower casings 64 and 22. The pivot pin guides are preferably made of a resilient plastic material such as Hytrel ® or nylon since this would prevent rattling and promote smooth pivoting.

Figure 5:
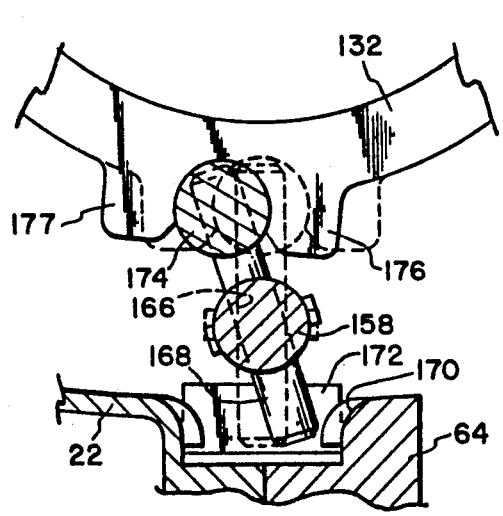
FIG. 5 is an enlarged fragmentary sectional view of the control guide assembly.
Figure 6:
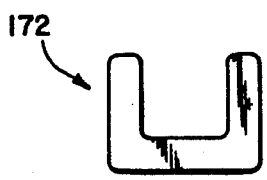
FIG. 6 is an end view of the control guide.
Figure 6A:
FIG. 6A is an elevational view of the control guide.

Referring now to FIGS. 1, 2, and 5, pump track ring 132, being pivotable around pivot pin 142 so as to be eccentrically pivotable about pintle 72, and controlled by an operator through a control mechanism 156 is located on the inboard side 154 of the hydrostatic unit 21 in accordance with another aspect of the present invention. The control mechanism 156 consists of a control rod 158 extending into the transaxle and which rotates therein through action of a control lever 162 attached to the control rod 158 via nut 164 threaded on the end of control rod 158 projecting beyond the transaxle. The control rod 158 has a radial bore 166 in which is disposed a control pin 168 that pivots in the direction of rotation of control rod 158, being attached thereto. The control pin 168 radially extends beyond the control rod 158 in one direction into a recess 170 formed in the upper and lower casings 64 and 22 in which is disposed a control guide 172. The control guide 172, FIGS. 6 and 6A, is a longitudinally elongated U-shaped member, preferably made of a plastic material such as Hytrel ® or nylon, and serves to eliminate noise and rattling as the control pin 168 pivots within the recess 170 when the control unit 156 is actuated. The control pin 168 also radially extends in the other direction and is captured in a recess of rod 174 disposed between pump track ring ears 176 and 177 so as to pivot pump track ring 132 around pivot pin 142 and eccentrically around pintle 72.

Thus as control lever 162 is moved by the operator, the stationary control rod 158 is rotated within the transaxle (FIG. 5), the dotted lines showing the movement of the control unit 158 and pump track ring 132. This pivots pump track ring 132 around pintle 72, and depending on the direction and relative degree of movement of the pump track ring 132, drives the motor 26 faster or slower in a forward or reverse direction according to the general principles of hydrostatic transmissions.

As pump track ring 132 is rotated, stops 178 and 179 radially disposed 180° from each other and 90° in both radial directions from the control unit 156, respectively cast in the upper and lower casings 64 and 22 (FIG. 2) provide a positive stop to prevent overtravel of the pump track ring 132. As pump track ring 132 upwardly pivots towards upper inner surface 189, the pump track ring contacts projection 178, and as pump track ring downwardly pivots towards lower inner surface 191, the pump track ring contacts projection 179. Thus on upward or downward travel, pump track ring 13 contacts the respective projection.

Figure 8:
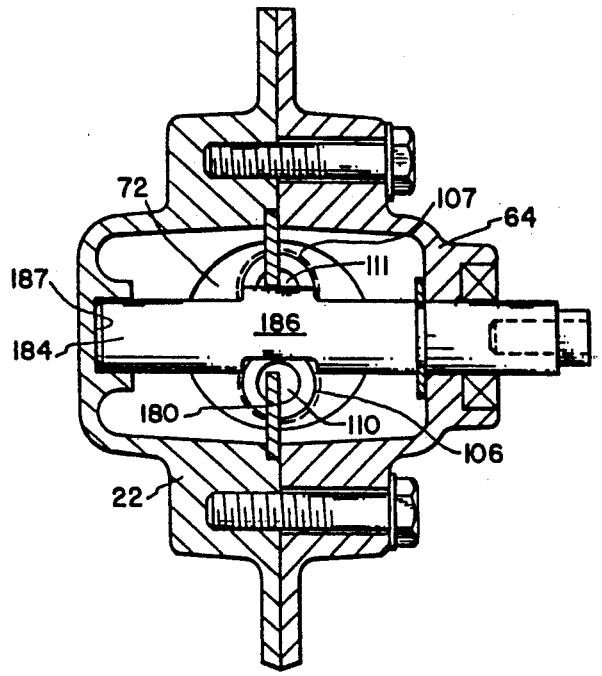
FIG. 8 is an enlarged sectional view of the dump valve assembly taken along line 8—8 of FIG. 1.

Referring to FIGS. 1 and 8, there is shown a flat one-piece dump valve plate 180 fabricated from stamped metal or alternatively made of a plastic material, having a bore 185 and plate fingers 182 and 183. Dump valve plate 180 with fingers 182 and 183 is disposed at the end of pintle tubes 106 and 107 where ball valves 110 and 111 are located within clearance slot 181 formed between the upper and lower casings 64 and 22. The plate fingers 182 and 183 respectively extend through discharge ports 115 and 117 to urge respective ball valves 110 and 111 off their seats 119 and 121 thereby causing communication of pintle passageways 106 and 107 with the interior chamber of the hydrostatic transaxle 20. A cam rod 184 having offset portion 186 extends through the plate 180 and is seated in cam rod journal 187 in lower housing 22. The cam rod 184 also extends in the axial direction through the upper housing 64 (see FIG. 13) and is connected to an operator controlled actuating lever (not shown) which allows the operator to rotate the cam rod 184 to cause disengagement of the hydrostatic unit 21. Upon a 90° rotation of cam rod 184, the cam portion 186 engages the plate 180 so as to cause radial movement of the plate 180 and fingers 115 and 117 towards pintle 72 to unseat the ball valves 110 and 111. Counter-rotation of the cam rod 184 by 90° thus rotates the cam portion 186 to urge plate 180 and fingers 115 and 117 away from ball valves 110 and 111 whereupon fluid pressure within pintle passageways 106 and 107 force the ball valves 110 and 111 into a closed position so that the hydrostatic unit 21 may again be operable.

In operation, when the operator of the vehicle in which the hydrostatic transaxle 20 is installed wants to manually push the vehicle, the hydrostatic unit 21 must be disengaged so that motion transmitted through the axles 46 and 47 does not cause the motor 26 to pump fluid to the pump 24 thereby transferring motion back to the input drive shaft 60 and the external energy source such as an internal combustion engine (not shown), as it would be difficult to act against the resistance of the hydrostatic unit 21 and the input shaft 60. Releasing the oil within the pintle passageways 106 and 107 of the pintle 72 fluidly disconnects the motor 26 from the pump 24 as the oil pumped from the motor 26 thereby exits from the discharge ports 115 and 117, into the hydrochamber, rather than into pump 24. The release of oil pressure within pintle 72 is accomplished by unseating the ball valves 110 and 111, being urged closed against threaded plug 112 and 113 defining discharge ports 115 and 117, through rotation of cam rod 184. Upon reseating of ball valves 110 and 111 when fingers 182 and 183 retract, the pump 24 and motor 26 are once again in fluid communication.

Referring to FIG. 2, particulates in the hydrostatic fluid circulating through the hydro unit are captured by cast-in protrusions or baffles 188 located in the lower transaxle housing 22 which serve as particulate traps, the impinging particulates settling to the bottom of the troughs 190 defined by the protrusions 188. Thus, any particulates that might be suspended in the oil are settled out upon circulation. This keeps the oil within the transaxle 20 relatively free from particulates that would otherwise degrade the performance and damage the various sensitive moving parts of the transaxle 20, and eliminates the need for a filter. In addition, a magnet 192 can be attached to the interior of lower housing 22 to attract and capture large ferrous materials that would not otherwise be captured by protrusions 188.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transaxle comprising:
    a housing having an upper part and a lower part;
    a hydrostatic transmission disposed within said housing, said transmission including a conduit, a radial piston type pump disposed on said conduit, and a radial piston type motor disposed on said conduit coaxial to said pump and in fluid communication therewith through said conduit, said pump having a plurality of radially disposed displaceable pistons, said motor having a plurality of radially disposed displaceable pistons;
    gearing operably connected to said motor;
    an axle assembly including differential means for operably connecting said gearing to said axle assembly, said axle assembly disposed parallel to said conduit;
    said hydrostatic transmission having an inboard side adjacent said axle assembly and an opposite outboard side;
    adjustment means for varying the displacement of said pistons, said adjustment means having a pivot axis on said outboard side of said transmission, said pivot axis disposed parallel to said axle assembly; and
    a control mechanism disposed at said inboard side between said axle assembly and said conduit for controlling said adjustment means.

2. The transaxle of claim 1, wherein said adjustment means is a track ring having a guide surface that is engaged by the pistons as they rotate.

3. The transaxle of claim 2, wherein said control mechanism comprises:
    a control rod; and
    actuator means operably connected to said control rod and to said track ring.

4. The transaxle of claim 3, wherein said control rod is rotatable, and said actuator means includes a control rod pin perpendicular with said control rod whereby said control rod pin pivots as said control rod rotates, said control rod being connected to said track ring.

5. A hydrostatic transaxle comprising:
    a housing having a first part and a second part, including a plurality of bolts for clampingly holding together said first part and said second part;
    a hydrostatic transmission disposed within said housing, said transmission including a pump fluidly connected to a motor, said pump having a plurality of displaceable, radially extending pistons;
    gearing operably connected to said motor;
    an axle assembly including differential means for operably connecting said gearing to said axle assembly;
    a pivot pin clamped between said housing parts;
    a track ring pivotally disposed on said pivot pin and radially surrounding said pistons for varying the displacement of said pistons as said track ring pivots, said pivot pin defining a pivot axis for said track ring; and
    said pin having at least one opening through which at least one of said plurality of bolts extends, the clamping force exerted by said bolt to clampingly hold together said housing securing said pivot pin.

6. The transaxle of claim 5, wherein said pivot pin is disposed on a side of said transmission remote from said axle assembly.

7. The hydrostatic transaxle of claim 5, wherein said pivot pin includes two openings disposed at each end thereof wherein two of said plurality of bolts extends therethrough, the clamping force exerted by said bolts to clampingly hold together said housing securing said pivot pin.

8. The hydrostatic transaxle of claim 7, wherein said pivot pin is disposed on the periphery of said housing remote from said axle assembly.

9. The hydrostatic transaxle of claim 5, wherein said pivot pin is disposed on the periphery of said housing on a side of said transmission remote from said axle assembly.

10. A hydrostatic transaxle comprising:
    a housing having a first part and a second part including a plurality of bolts for clampingly holding together said first part and said second part;
    a hydrostatic transmission disposed within said housing, said transmission including a pump in fluid communication with a motor, said pump including a plurality of radially extending displaceable pistons;
    gearing operably connected to said motor;
    an axle assembly including differential means for operably connecting said gearing to said axle assembly;
    a pivot pin clamped between said housing parts and having at least one opening through which at least one of said plurality of bolts extends, the clamping force exerted by said bolt to clampingly hold together said housing securing said pivot pin;
    a track ring pivotally disposed on said pivot pin and radially surrounding said pistons for varying the displacement of said pistons, said pivot pin defining a pivot axis for said track ring; and
    a control mechanism disposed adjacent said axle assembly for adjusting said track ring.

11. The transaxle of claim 10, wherein said control mechanism
   a control rod; and
   actuator means operably connected to said control rod and to said track ring.

12. The transaxle of claim 11, wherein said control rod is rotatable, and said actuator means includes a control rod pin perpendicular with said control rod whereby said control rod pin pivots as said control rod rotates.

13. The transaxle of claim 10, wherein said pivot pin is disposed on the periphery of said housing remote from said axle assembly.

14. The hydrostatic transaxle of claim 10, wherein said pivot pin includes two openings disposed at each end whereby two of said plurality of bolts extends therethrough, the clamping force exerted by said bolts to clampingly hold together said housing securing said pivot pin.

15. The hydrostatic transaxle of claim 14, wherein said pivot pin is disposed remote from said axle assembly.

16. The hydrostatic transaxle of claim 10, wherein said pivot pin is disposed on the periphery of said housing on a side of said transmission remote from said axle assembly.

* * * * *